United States Patent
Kloepper et al.

(10) Patent No.: US 12,399,468 B2
(45) Date of Patent: Aug. 26, 2025

(54) DETERMINING APPROPRIATE SEQUENCES OF ACTIONS TO TAKE UPON OPERATING STATES OF INDUSTRIAL PLANTS

(71) Applicant: ABB Schweiz AG, Baden (CH)

(72) Inventors: Benjamin Kloepper, Mannheim (DE); Benedikt Schmidt, Heidelberg (DE); Reuben Borrison, Brühl (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/672,276

(22) Filed: May 23, 2024

(65) Prior Publication Data

US 2024/0310797 A1    Sep. 19, 2024

Related U.S. Application Data

(63) Continuation of application No. PCT/EP2022/080269, filed on Oct. 28, 2022.

(30) Foreign Application Priority Data

Nov. 23, 2021    (EP) ..................................... 21209772

(51) Int. Cl.
    *G05B 13/02*    (2006.01)
(52) U.S. Cl.
    CPC .................. *G05B 13/027* (2013.01)
(58) Field of Classification Search
    CPC .............. G05B 13/027; G05B 19/0428; G05B 23/0259; G06F 9/453
    See application file for complete search history.

(56) References Cited

U.S. PATENT DOCUMENTS

| | | |
|---|---|---|
| 5,265,222 A | 11/1993 | Nishiya et al. |
| 9,952,566 B2 | 4/2018 | Düll et al. |
| 2014/0237487 A1 | 8/2014 | Prasanna et al. |

(Continued)

FOREIGN PATENT DOCUMENTS

| | | |
|---|---|---|
| CN | 111633467 A | 9/2020 |
| CN | 111727441 A | 9/2020 |

(Continued)

OTHER PUBLICATIONS

Japan Patent Office, Office Action in Japanese Patent Application No. 2024-530471, 7 pp. (Oct. 15, 2024).

(Continued)

*Primary Examiner* — Christopher E. Everett
(74) *Attorney, Agent, or Firm* — Leydig, Voit & Mayer, Ltd.

(57) ABSTRACT

A method for determining an appropriate sequence of actions to take during operation of an industrial plant includes obtaining values of a plurality of state variables that characterize an operational state of the plant (or a part thereof); encoding by at least one trained state encoder network the plurality of state variables into a representation of the operating state of the plant; mapping by a trained state-to-action network the representation of the operating state to a representation of a sequence of actions to take in response to the operating state; and decoding by a trained action decoder network the representation of the sequence of actions to the sought sequence of actions to take.

13 Claims, 3 Drawing Sheets

(56) References Cited

U.S. PATENT DOCUMENTS

| | | | |
|---|---|---|---|
| 2019/0232488 A1* | 8/2019 | Levine | B25J 9/161 |
| 2019/0258938 A1* | 8/2019 | Mnih | G06N 3/084 |
| 2019/0347590 A1 | 11/2019 | Rajasekaran et al. | |
| 2020/0026976 A1 | 1/2020 | Bagley, Jr. | |
| 2021/0097401 A1 | 4/2021 | Ramalho et al. | |
| 2022/0044110 A1* | 2/2022 | Ryu | G06N 3/08 |
| 2022/0274251 A1* | 9/2022 | Leon | G06N 3/047 |

FOREIGN PATENT DOCUMENTS

| | | |
|---|---|---|
| CN | 111832703 A | 10/2020 |
| CN | 113168139 A | 7/2021 |
| CN | 113408721 A | 9/2021 |
| JP | 3-166601 A | 7/1991 |
| WO | WO 2018/226436 A1 | 12/2018 |
| WO | WO 2019/104296 A1 | 5/2019 |

OTHER PUBLICATIONS

Abe et al., "PID gain tuning method for oil refining controller based on neural networks," *International J. of Innovative Computing, Information and Control*, 4(10): 4 pp. (Oct. 2008).

Ahn et al., "Deep learning-based procedure compliance check system for nuclear power plant emergency operation," *Nuclear Engineering and Design*, 370: 10 pp. (Dec. 15, 2020).

Dorgo et al., "Learning and predicting operation strategies by sequence mining and deep learning," *Computers and Chemical Engineering*, 128: 174-187 (Sep. 2019).

Lee et al., "A dynamic neural network based accident diagnosis advisory system for nuclear power plants," *Progress in Nuclear Energy*, 46(3-4): 268-281 (2005).

Lee et al., "Use of dynamic event trees and deep learning for real-time emergency planning in power plant operation," *Nuclear Technology*, 205(8): 1035-1042 (Aug. 2019).

Mo et al., "A neural network based operation guidance system for procedure presentation and operation validation in nuclear power plants," *Annals of Nuclear Energy*, 34(10): 813-823 (Oct. 2007).

European Patent Office, Extended European Search Report in European Patent Application No. 21209772.9, 9 pp. (May 16, 2022).

European Patent Office, International Preliminary Report on Patentability in International Patent Application No. PCT/EP2022/080269, 6 pp. (Oct. 5, 2023).

European Patent Office, International Search Report in International Patent Application No. PCT/EP2022/080269, 4 pp. (Jan. 31, 2023).

European Patent Office, Written Opinion in International Patent Application No. PCT/EP2022/080269, 9 pp. (Jan. 31, 2023).

* cited by examiner

DETERMINING APPROPRIATE SEQUENCES OF ACTIONS TO TAKE UPON OPERATING STATES OF INDUSTRIAL PLANTS

CROSS-REFERENCE TO RELATED APPLICATIONS

The instant application claims priority to European Patent Application No. 21209772.9, filed Nov. 23, 2021, and to International Patent Application No. PCT/EP2022/080269, filed Oct. 28, 2022, each of which is incorporated herein in its entirety by reference.

FIELD OF THE DISCLOSURE

The present disclosure generally relates to monitoring industrial plants and determining actions to take in response to particular operating states such as abnormal operating states.

BACKGROUND OF THE INVENTION

The intended operation of many industrial plants is controlled by distributed control systems (DCS) that adjust set-points of low-level controllers in order to optimize one or more key performance indicators, KPI. The plant is also continuously monitored for any abnormal conditions, such as equipment failure or malfunction. This monitoring may be at least partially integrated with control by the DCS.

When an abnormal condition is detected, it is not always possible to remedy it automatically by means of the DCS. In every plant, there are abnormal situations that need to be remedied by an operator executing a certain sequence of actions. WO 2019/104 296 A1 discloses an alarm management system that assists an operator with identifying high priority alarms. However, the outputting of the alarm to the operator is only the first step towards remedying the abnormal condition. It is also necessary that the operator executes the correct sequence of actions.

US 2020/026 976 A1 discloses a method for harmonizing industrial machines with an intelligent industrial assistant having a set of pre-defined commands. States of a proprietary I/O interface of a machine are mapped to pre-defined commands. Based on this mapping, a customized interface for the machine is generated.

US 2021/097 401 A1 discloses a neural network system for the processing of input data values. Input data values are encoded by an encoder network, and the encoded products are aggregated with an aggregator. A combination of the aggregated output and a target input value is decoded by a decoder to yield the final output.

US 2014/237 487 A1 discloses an event processing system and a method of operation. Based on observations derived from measurements, the occurrence of an event is detected. Based on the event, a to-be-performed state transition and a to-be-performed action are determined.

BRIEF SUMMARY OF THE INVENTION

The present disclosure aids a plant operator in remedying an abnormal situation by computing, from information gained during the monitoring of an industrial plant or a part thereof, a sequence of actions to take. In one embodiment, a computer-implemented method for determining an appropriate sequence of actions to take during operation of an industrial plant or part thereof is described. In the course of this method, values of a plurality of state variables that characterize an operational state of the plant or part thereof are obtained. For example, these values may be combined in a vector or tensor. The concrete set of state variables that is needed to characterize the state of a plant or part thereof is plant-specific. Examples of such state variables include a pressure, a temperature, a mass flow, a voltage, an electrical current, a fill level, and a concentration of a substance in a mixture of substances.

The plurality of state variables (e.g., the vector or tensor comprising the values of the state variables) is encoded, by at least one trained state encoder network, into a representation of the operating state of the plant or part thereof. In particular, such a representation may have a much lower dimensionality than the original plurality of state variables. I.e., the representation may depend on a much smaller number of variables than the original vector with the values of state variables.

Examples for state variables include, but are not limited to: variables that are at least indicative of process variables, such as pressures, mass flows, voltages or currents; events that denote discrete changes in the plant, such as the switching on or off of a motor, a signal crossing an alarm limit, the opening or closing of a valve; and a combination of process variables and events. When the state variables include both process variables and events, the state encoder network may be a combined state encoder network that takes both process variables and events as inputs simultaneously. But a combination of two state encoder networks, wherein the one encodes the process variables and the other encodes the events, may also be used.

By using a trained state-to-action network, the representation of the operating state is mapped to a representation of a sequence of actions to take in response to the operating state. In particular, just like a small number of variables may encode a complex operating state of the plant that depends on very many state variables, a small number of variables may also encode a complex sequence of actions comprising many different actions.

The representation of the sequence of actions is decoded to the sought sequence of actions to take by a trained action decoder network. The so-determined sequence of actions may then be used in any possible manner in order to remedy an abnormal situation. For example, to the extent that the actions in the sequence can be performed automatically, the automatic performing of these actions may be triggered. For actions that can only be performed by an operator, the operator may be notified in any suitable manner to perform them. Also, any suitable actions may be taken to aid the operator in performing such action. For example, if the operator needs to operate some particular control element in a human-machine interface of the DCS, this may be highlighted. If an action requires the operation of a physical control (such as a button, switch or knob) and this is control guarded by a cover to prevent accidental or inadvertent operation, the cover may unlock and/or open. Likewise, if the action requires physical access to certain equipment, access doors to the location of the equipment may be unlocked, and/or the location of the equipment may be rendered safe for the operator to enter, such as by stopping equipment that might harm the operator. Hybrid solutions in the sense that actions available in the HMI of a DCS are executed automatically, without human intervention or optionally at least under human supervision (i.e., the human observes as the sequence of actions proposed by the system is executed automatically) are also possible.

Examples for actions in the sequence of actions include: enabling or disabling a piece of equipment in the plant or part thereof; opening or closing a valve in the plant or part thereof; and changing a set-point value of at least one low-level controller in the plant or part thereof.

The main evaluation of the operating state of the plant happens when the representation of this operating state is mapped to a representation of a sequence of actions. Since the representations usually have a much lower dimensionality than the operating state, respectively the sequence of actions, this means that the evaluation merely comprises a mapping between two low-dimensional spaces. This makes the state-to-action network a lot easier to train than a network that directly gets high-dimensional operating states and directly outputs high-dimensional action sequences. In particular, that the state-to-action network is easier to train comprises that the training requires a lesser quantity of training samples.

Moreover, distinct tasks in the overall processing chain, namely: going from a high-dimensional input to a low-dimensional representation, processing this representation into another representation in another low-dimensional space, and going from that second low-dimensional representation space into a second high-dimensional output space, are assigned to distinct networks that can specialize on their respective jobs. This improves the overall accuracy of the finally determined output compared with the use of a single network that has to perform all tasks at once and may have to make a trade-off between conflicting goals. This is somewhat akin to the philosophy of Unix tools, such as sed, awk or grep. Each tool is built to do exactly one single simple job, and excel at that one single simple job. For more complex jobs, the output of one tool is piped into the other as input.

In a particularly advantageous embodiment, the state encoder network is chosen to be an encoder part of an encoder-decoder arrangement that first maps a plurality of state variables to a representation of the operating state of the plant or part thereof and then reconstructs a plurality of state variables from this representation. Such an encoder-decoder arrangement may be trained in a self-supervised manner. That is, a training sample may be inputted into the arrangement, and the outcome of the arrangement may be evaluated as to how well it is in agreement with the original input. For this training to work, the training samples do not need to be labelled with "ground truth". In machine learning applications, obtaining "ground truth" is the most expensive part of the training.

Moreover, training for a reconstruction in this manner trains the encoder-decoder arrangement to force the part of the input that is most salient for the reconstruction through the "information bottleneck" of the low-dimensional representation. This eliminates less important portions of the input, such as noise. Therefore, the encoder also gets some de-noising functionality by virtue of the training.

Alternatively or in combination to this, in another particularly advantageous embodiment, the action decoder network is chosen to be a decoder part of an encoder-decoder arrangement that first maps a sequence of actions, and/or a processing result derived from this sequence of actions, to a representation, and then reconstructs a sequence of actions, and/or a processing result derived therefrom, from this representation. The advantages are the same.

Reconstructing a "processing result" means that, for example, the encoder-decoder arrangement may be trained to predict, based on a part of a sequence of actions, the next action in this sequence of actions.

Examples of networks that may be used as encoder networks and/or decoder networks for operating states, and/or for sequences of actions, include recurrent neural networks, RNNs, and transformer networks. In a recurrent neural network, the output is fed back as input, and the network is executed for a predetermined number of iterations. A transformer neural network comprises a sequence of multiple coding units, each of which comprises an attention head that computes correlations between different parts of the input. Both architectures are particularly useful for processing sequences as inputs.

The state-to-action network may, for example, comprise a convolutional neural network. In a particularly advantageous embodiment, the state-to-action network comprises a fully connected neural network. This architecture provides the greatest flexibility for training, at the price that it contains many parameters per size of the input and output. As discussed before, the dimensionality of the representation of the operating state, as well as the dimensionality of the representation of the sequence of actions, is rather low. Therefore, the higher number of parameters that a fully connected neural network has may be accommodated.

Exemplary plants where the method is particularly advantageous, especially to remedy abnormal situations, include continuous or process plants that are configured to emit alarms and events data. For example, the method may be used to remedy abnormal situations in: a waste incineration plant; a hydrocarbon separation plant; a reinjection system for injecting water into a hydrocarbon well; a hydrocarbon exploitation facility; and/or a deglycol regeneration plant.

These plants have in common that abnormal situations frequently pose safety issues. In case of a high priority alarm, if a wrong sequence of actions is commenced, or if errors are made when executing the correct sequence (such as omitting a step or swapping the order of two steps), this may make the abnormal situation worse, possibly forgoing the last opportunity to get the plant under control again. Also, because safety-critical abnormal situations are fortunately rare, there is only little training data for these situations available. It is therefore advantageous that the method can work with lesser training data because the main reasoning is, as discussed before, done between two spaces of rather low dimensionality.

BRIEF DESCRIPTION OF THE SEVERAL VIEWS OF THE DRAWING(S)

DETAILED DESCRIPTION OF THE INVENTION

Figure 1:
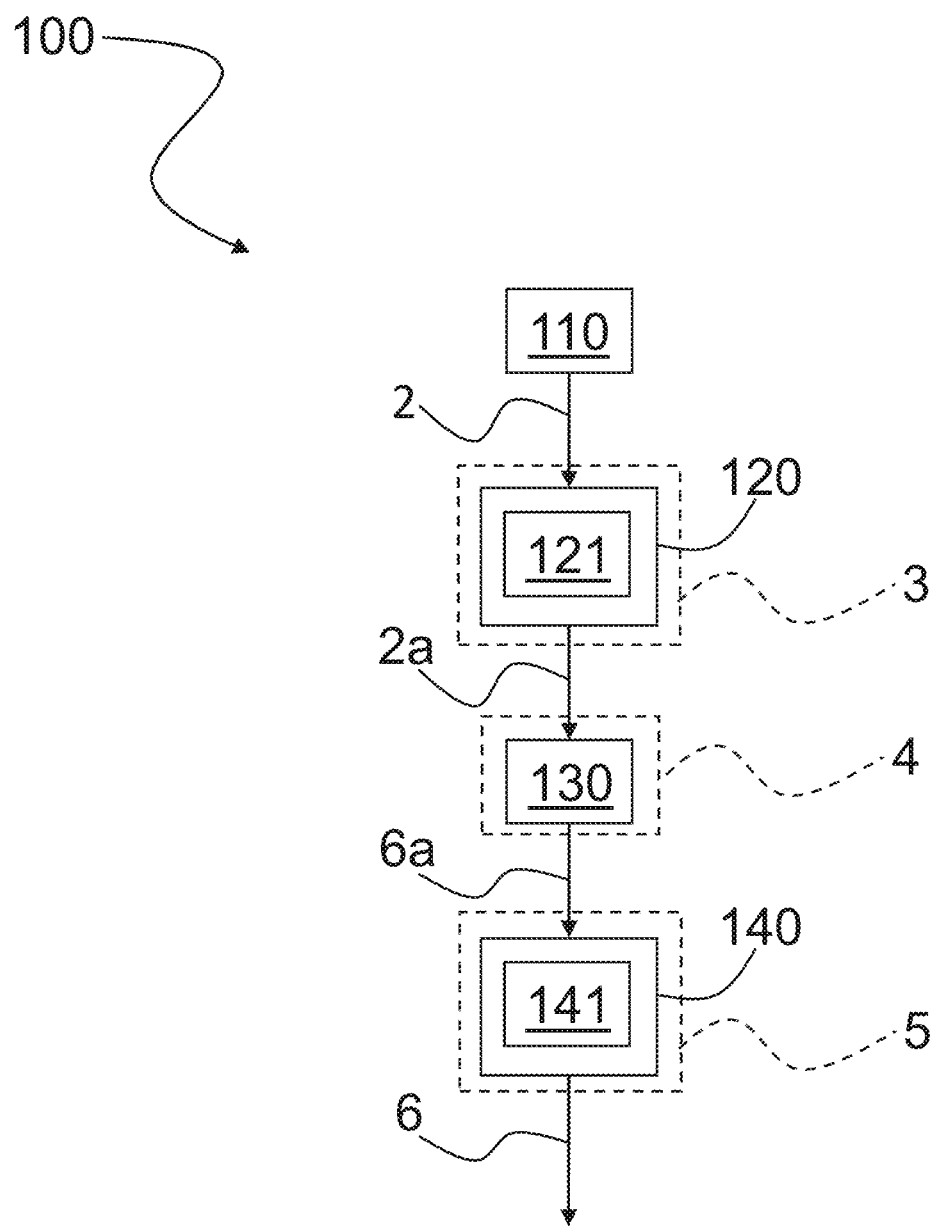
FIG. 1 is a flowchart for a method 100 for determining an appropriate sequence of actions to take during operation of an industrial plant in accordance with the disclosure.

FIG. 1 is a schematic flow chart of an embodiment of the method 100 for determining an appropriate sequence of actions to take during operation of an industrial plant 1. In step 110, values of a plurality of state variables 2 that characterize an operational state of the plant 1 or part thereof are obtained. In step 120, the plurality of state variables 2 are encoded into a representation 2a of the operating state of the plant 1 or part thereof by at least one trained state encoder network 3.

According to block 121, the state encoder network 3 may be chosen to be an encoder part of an encoder-decoder arrangement that first maps a plurality of state variables 2 to a representation 2a of the operating state of the plant 1 or part thereof and then reconstructs a plurality of state variables 2 from this representation 2a.

In step 130, the representation 2a of the operating state is mapped to a representation 6a of a sequence 6 of actions to take in response to the operating state by a trained state-to-action network 4. In step 140, the representation 6a of the sequence 6 of actions is decoded to the sought sequence 6 of actions to take by a trained action decoder network 5. According to block 141, the action decoder network 5 may be chosen to be a decoder part of an encoder-decoder arrangement that first maps a sequence 6 of actions, and/or a processing result derived from this sequence 6 of actions, to a representation 6a, and then reconstructs a sequence 6 of actions, and/or a processing result derived therefrom, from this representation 6a.

Figure 2:
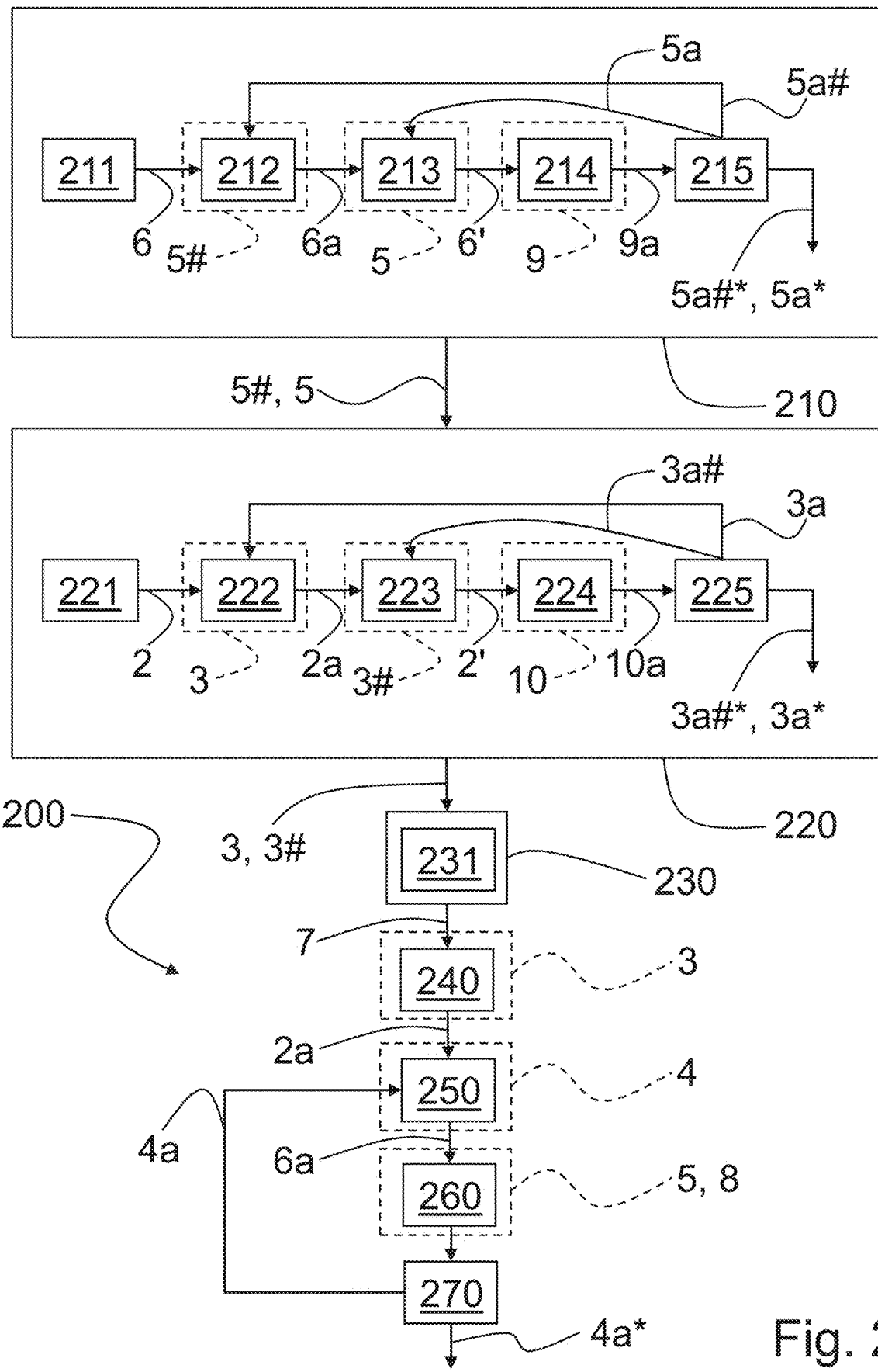
FIG. 2 is a flowchart for an exemplary embodiment of a method 200 for training an arrangement of networks for use in the method 100, in accordance with the disclosure.

FIG. 2 is a schematic flow chart of an embodiment of the method 200 for training an arrangement of networks 3, 4, 5 for use in the method 100 described above. In step 210, a pre-trained first encoder-decoder arrangement of an action encoder network 5# and an action decoder network 5 is obtained. In the example shown in FIG. 2, this obtaining comprises the additional steps of: obtaining, according to block 211, training samples of sequences 6 of actions; providing, according to block 212, the sequence 6 of actions in each training sample, and/or a processing result derived therefrom, to the to-be-trained action encoder network 5#, thereby obtaining a representation 6a; providing, according to block 213, this representation 6a to the to-be-trained action decoder network 5, thereby obtaining a sequence 6' of actions, and/or a processing result derived therefrom; measuring, according to block 214, by means of a predetermined loss function 9, to which extent this sequence 6' of actions, and/or this processing result, is in agreement with the sequence 6 of actions, and/or the processing result, in the training sample; and optimizing, according to block 215, parameters 5a#, 5a that characterize the behavior of the to-be-trained action encoder network 5# and the to-be-trained action decoder network 5 such that, when further training samples are processed, the rating 9a by the loss function 9 is likely to improve. The finally optimized state of the parameters 5a#, 5a is labelled with the reference sign 5a#*, 5a*.

In step 220, a pre-trained second encoder-decoder arrangement of a state encoder network 3 and a state decoder network 3# is obtained. In the example shown in FIG. 2, this obtaining comprises the additional steps of: obtaining, according to block 221, training samples comprising values of a plurality of state variables 2 that characterize an operating state of the plant 1 or part thereof; providing, according to block 222, the values of state variables 2 in each training sample to the to-be-trained state encoder network), thereby obtaining a representation 2a; providing, according to block 223, this representation 2a to the to-be-trained state decoder network 3#, thereby obtaining values 2' of state variables; measuring, according to block 224, by means of a predetermined loss function 10, to which extent these values 2' are in agreement with the values 2 in the training sample; and optimizing, according to block 225, parameters 3a, 3a# that characterize the behavior of the to-be-trained state encoder network 3 and the to-be-trained state decoder network 3 such that, when further training samples are processed, the rating 10a by the loss function 10 is likely to improve. The finally optimized state of the parameters 3a, 3a# is labelled with the reference sign 3a*, 3a#*.

In step 230, samples 7 of training data are obtained. Each sample 7 comprises values of a plurality of state variables 2 that characterize the operating state of the plant 1 or part thereof, and a sequence 6* of actions taken in response to this operating state.

According to block 231, obtaining 230 of training samples 7 for the training of the first encoder-decoder arrangement, and/or the second encoder-decoder arrangement, and/or the state-to-action network 4, comprises aggregating training samples 7 obtained in multiple industrial plants 1.

In step 240, the values of the state variables 2 in each sample 7 are encoded into a representation 2a of the respective operating state by the pre-trained state encoder network 3. In step 250, the representation 2a of the operating state is mapped to a representation 6a of a sequence 6 of actions. In step 260, it is measured, by means of a predetermined loss function 8, to which extent the representation 6a of the sequence of actions is in agreement with a representation 6a* obtained by encoding, by the pre-trained action encoder network 5#, the sequence 6 of actions in the training sample 7; and/or a sequence of actions 6* obtained by decoding, by the pre-trained action decoder network 5, the representation 6a of the sequence 6 of actions is in agreement with the sequence 6* of actions in the training sample 7;

In step 270, parameters 4a that characterize the behavior of the to-be-trained state-to-action network 4 are optimized such that, when further training samples 7 are processed, the rating 8a by the loss function 8 is likely to improve. The finally optimized state of the parameters 4a is labelled with the reference sign 4a*.

Figure 3:
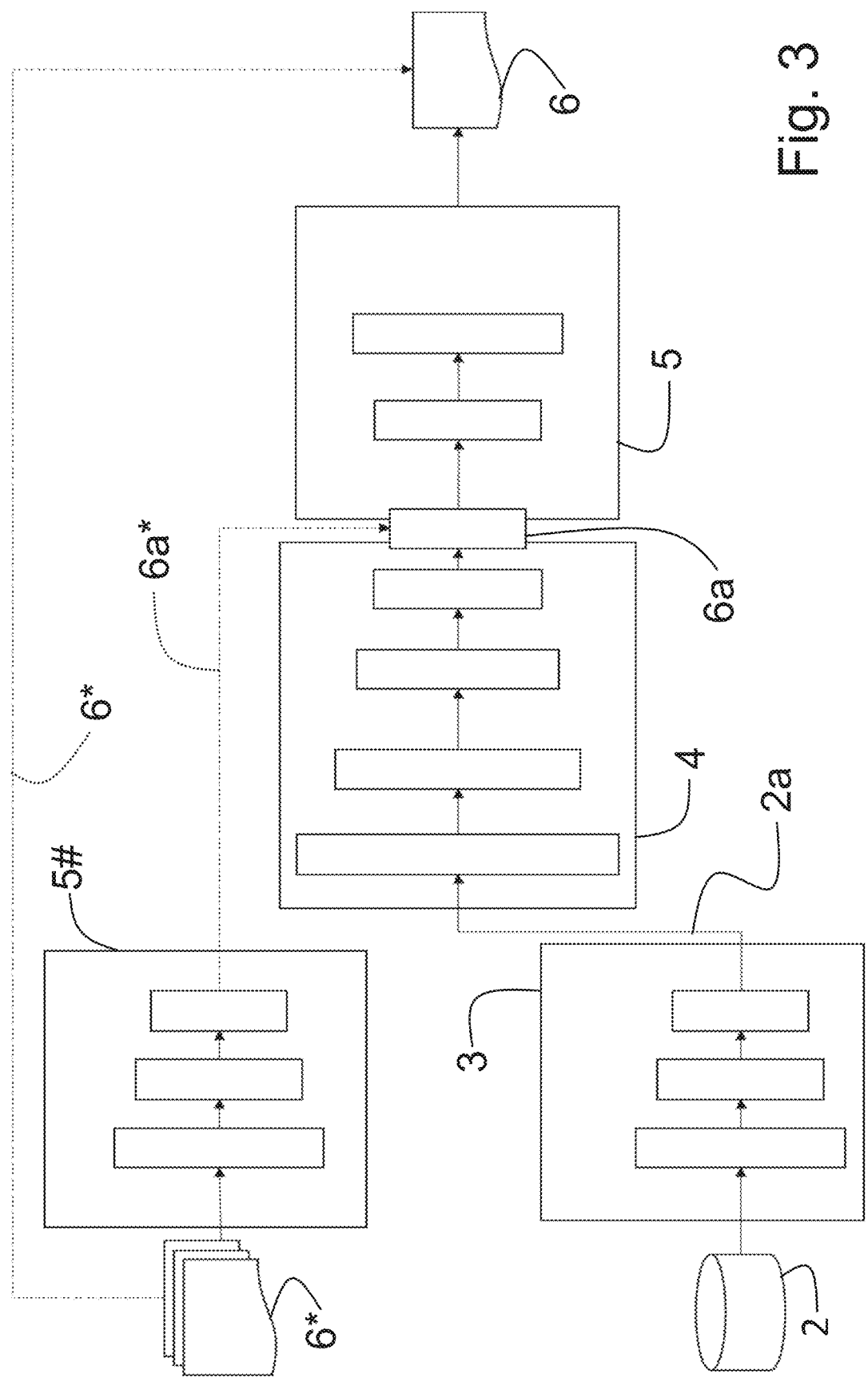
FIG. 3 is a diagram illustrating two manners in which a state-to-action network 4 may be trained in accordance with the disclosure.

FIG. 3 illustrates the two manners in which the state-to-action network 4 may be trained. Values of one or more state variables 2 from a training sample 7 are encoded to a representation 2a of the operating state of the plant 1. By means of the state-to-action network 4, this representation 2a is mapped to a representation 6a of a sequence 6 of actions. This representation 6a needs to be compared with a "ground truth" sequence of actions 6* in the training sample 7, so as to measure to which extent the representation 6a outputted by the state-to-action network 4 is correct.

In a first manner, the "ground truth" sequence 6* of actions is encoded, by the pre-trained action encoder network 5#, into a "ground truth" representation 6a*. The loss function 8 measures to which extent the representation 6a outputted by the state-to-action network 4 is in agreement with o the "ground truth" representation 6a*.

In a second manner, the representation 6a outputted by the state-to-action network 4 is decoded by the pre-trained action decoder network 5, so as to obtain a sequence 6' of actions. The loss function 8 then measures to which extent this sequence 6 of actions is in agreement with the "ground truth" sequence 6* of actions.

The invention also provides a method for training an arrangement of networks for use in the method described above. In the course of this method, a pre-trained first encoder-decoder arrangement of an action encoder network and an action decoder network is obtained. Also, a pre-trained second encoder-decoder arrangement of a state encoder network and a state decoder network is obtained.

Samples of training data are obtained. Each such sample comprises values of a plurality of state variables that characterize the operating state of the plant or part thereof. These state variables are input data for the to-be-trained arrangement. Each sample also comprises sequence of actions taken in response to this operating state. This sequence is the "ground truth" label attached to the operating state of the sample.

The values of the state variables in each sample are encoded into a representation of the respective operating state by the pre-trained state encoder network. The resulting representation of the operating state is mapped to a representation of a sequence of actions. The sequence of actions encoded in this representation is the sequence of actions that the arrangement of networks is proposing given the operating state characterized by the state variables.

Correspondence of this sequence of actions to the "ground truth" that is attached to the sample is measured by means of a cost function. This can be accomplished by any one, or a combination, of the following two manners: According to the first manner, the loss function measures to which extent the representation of the sequence of actions is in agreement with a representation obtained by encoding, by the pre-trained action encoder network, the sequence of actions in the training sample; According to the second manner, the loss function measures to which extent a sequence of actions obtained by decoding, by the pre-trained action decoder network, the representation of the sequence of actions is in agreement with the sequence of actions in the training sample.

In the course of the training, parameters that characterize the behavior of the to-be-trained state-to-action network are optimized such that, when further training samples are processed, the rating by the loss function is likely to improve.

The state variables may be obtained during a real execution of a process on the plant, or after such execution from a plant historian, or from execution of simulation with a process simulator producing the same state-variables as the process on the plant. The usage of a process simulator is particular beneficial for newly commissioned plants with little historical data and when the model is first trained on simulated data capturing the general process dynamics and later with the limited amount of data from the real process execution. Likewise, the sequences of actions may be monitored during execution of the process, or it may be obtained after such execution from an action log, or for initial training be obtained from simulation experiments with real plant operators or predefined actions sequences. Since both the state variables in the plant historian and the actions in the action log are timestamped, they can be correlated to each other. The training may thus be understood to "mine" a workflow with which the plant operator reacts to a particular situation and teach the network arrangement to propose this workflow when this, or a substantially similar, situation occurs again. In this manner, even knowledge that is present in the operator's mind but hard to put in words, or to communicate to another operator, may be put to use.

For example, if an operator has learned to "open a valve slowly if the flame turns bluish", each operator may perceive the moment at which the flame turns bluish slightly differently. Also, different operators may have different notions of opening a valve "slowly". The present training method allows to capture knowledge in an automated manner that leaves no room for interpretation.

In a particularly advantageous embodiment, the obtaining of a first pre-trained encoder-decoder arrangement of an action encoder network and an action decoder network comprises: obtaining training samples of sequences of actions; providing the sequence of actions in each training sample, and/or a processing result derived therefrom, to the to-be-trained action encoder network, thereby obtaining a representation; providing this representation to the to-be-trained action decoder network, thereby obtaining a sequence of actions, and/or a processing result derived therefrom; measuring, by using a predetermined loss function, to which extent this sequence of actions, and/or this processing result, is in agreement with the sequence of actions, and/or the processing result, in the training sample; and optimizing parameters that characterize the behavior of the to-be-trained action encoder network and the to-be-trained action decoder network such that, when further training samples are processed, the rating by the loss function is likely to improve.

The training samples used for this pre-training may have training samples in common with the main training discussed above, but it may also be performed on a set of training samples disjoint from the one used for the main training. For example, the pre-training may be performed in a generic manner once for a particular type of plant. For each instance of the plant that is subsequently installed, the pre-trained encoder-decoder arrangement may then be used in the training of the state-to-sequence network. Optionally, when moving from the generic training to a concrete instance of the plant, the pre-training of the encoder-decoder arrangement may be refined using further training samples that have been acquired from this instance of the plant.

Pre-training might be done with a variety of tasks for which "ground truth labels" can be easily produced from the available process state data and the actions sequences. Examples of such tasks are reconstruction of the input (plant state variables or action sequences), predicting the next n elements of the sequences (plant state variables or action sequences), identifying the correct next sequence segments among a number of presented sequence segments, identifying the correct previous sequence segments among a number of presented sequence segments, identifying whether presented sequence are neighbors in the overall sequence, etc. Such tasks might also be combined in parallel or in sequence which is beneficial because it further increases the amount of training data for pre-training and also prevents overfitting the pre-trained model to a single task.

The same advantages apply, in an analogous manner, to a further particularly advantageous embodiment where the obtaining of a second pre-trained encoder-decoder arrangement of a state encoder network and a state decoder network comprises: obtaining training samples comprising values of a plurality of state variables that characterize an operating state of the plant or part thereof; providing the values of state variables in each training sample to the to-be-trained state encoder network, thereby obtaining a representation; providing this representation to the to-be-trained state decoder network, thereby obtaining values of state variables; measuring, by means of a predetermined loss function, to which extent these values are in agreement with the values in the training sample; and optimizing parameters that characterize the behavior of the to-be-trained state encoder network and the to-be-trained state decoder network such that, when further training samples are processed, the rating by the loss function is likely to improve.

In a further particularly advantageous embodiment, the to-be-trained action encoder network and the to-be-trained state encoder network are combined in one single network architecture. This single network architecture may depend on fewer parameters than a combination of two individual architectures, resulting in an easier training. Also, since the tasks performed by both networks have something in common, the two trainings may benefit from each other to some degree by "sharing" knowledge in the one single network architecture.

In a further particularly advantageous embodiment, the obtaining of training samples for the training of the first encoder-decoder arrangement, and/or the second encoder-decoder arrangement, and/or the state-to-action network, comprises aggregating training samples obtained in multiple industrial plants. This improves the overall variability in the set of training samples, resulting in a better performance of the final arrangement of networks in terms of accuracy. As discussed before, abnormal situations that pose safety risks tend to occur very rarely in any given plant. Because of the safety risks, it is usually not practical to provoke such a situation just for the purpose of acquiring training samples. But in a larger fleet of plants, there will be enough instances of the abnormal situations occurring on their own that a reasonable amount of training samples may be gathered.

As discussed before, the methods are computer-implemented. The invention therefore also relates to one or more computer programs with machine-readable instructions that, when executed on one or more computers and/or compute instances, cause the one or more computers to perform a method described above. In this context, a virtualization platform, a hardware controller, network infrastructure devices (such as switches, bridges, routers or wireless access points), as well as end devices in the network (such as sensors, actuators or other industrial field devices) that are able to execute machine readable instructions are to be regarded as computers as well.

The invention therefore also relates to a non-transitory storage medium, and/or to a download product, with the one or more computer programs. A download product is a product that may be sold in an online shop for immediate fulfillment by download. The invention also provides one or more computers and/or compute instances with the one or more computer programs, and/or with the one or more non-transitory machine-readable storage media and/or download products.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE SIGNS 1 industrial plant
2 state variables characterizing operational state of plant 1
2' state variables decoded during encoder-decoder training
2a representation of operational state of plant 1
3 state encoder network
3a parameters, characterize behavior of network 3
3a* finally optimized state of parameters 3a
3# state decoder network
3a# parameters, characterize behavior of network 3#
3a#* finally optimized state of parameters 3a#
4 state-to-action network
4a parameters, characterize behavior of network 4
4a* finally optimized state of parameters 4a
action decoder network
5a parameters, characterize behavior of network 5
5a* finally optimized state of parameters 5a
5# action encoder network
5a# parameters, characterize behavior of network 5#
5a#* finally optimized state of parameters 5a#
6 sequence of actions
6' sequence decoded during encoder-decoder training
6* sequence of actions in training sample 7
6a representation of sequence 6 of actions
6a* representation encoded from sequence 6*
7 training samples for training state-to-action network 4
8 loss function for training state-to-action network 4
8a rating by loss function 8
9 loss function for action encoder-decoder arrangement 5#, 5
9a rating by loss function 9
10 loss function for state encoder-decoder arrangement 3, 3#
10a rating by loss function 10
100 method for determining appropriate sequence 6 of actions
110 obtaining state variables 2
120 encoding state variables into representation 120
121 choosing state encoder 3 from encoder-decoder arrangement
130 mapping representation 2a to sequence representation 6a
140 decoding representation 6a to sought sequence 6

141 choosing action decoder 5 from encoder-decoder arrangement
200 method for training arrangement of networks 3, 4, 5
210 obtaining pre-trained first encoder-decoder arrangement 5#, 5
211 obtaining training samples of sequences 6
212 providing training sequence 6 to action encoder network 5#
213 providing representation 6a to action decoder network 5
214 rating decoded sequence 6' with loss function 9
215 optimizing parameters 5a#, 5# of networks 5a, 5
220 obtaining pre-trained second encoder-decoder arrangement 3, 3#
221 obtaining training samples of state variables 2
222 providing state variables 2 to state encoder network 3
223 providing representation 2a to state decoder network 3#
224 rating values 2' with loss function 10#
225 optimizing parameters 3a, 3a# of networks 3, 3#
230 obtaining samples 7 of training data
231 aggregating training samples 7 across plants
240 encoding training state variables 2 into representation 2a
250 mapping state representation 2a to sequence representation 6a
260 rating sequence representation 6a/sequence 6 with loss function 8
270 optimizing parameters 4a of state-to-action network 4

What is claimed is:

1. A computer-implemented method for determining an appropriate sequence of actions to take during operation of an industrial plant or part thereof, comprising:
   obtaining values of a plurality of state variables that characterize an operational state of the plant or part thereof;
   encoding by at least one trained state encoder network the plurality of state variables into a representation of the operating state of the plant or part thereof, wherein the representation of the operating state depends on fewer variables than the operating state of the plant;
   mapping by a trained state-to-action network the representation of the operating state to a representation of a sequence of actions to take in response to the operating state, wherein the representation of the sequence of actions depends on fewer variables than the sequence of actions; and
   decoding by a trained action decoder network the representation of the sequence of actions to the sequence of actions to take,
   wherein the state variables comprise one or more of: a pressure, a temperature, a mass flow, a voltage, an electrical current, a fill level, and/or a concentration of a substance in a mixture of substances, and
   wherein the actions comprise one or more of: enabling or disabling a piece of equipment in the plant or part thereof; opening or closing a valve in the plant or part thereof; and changing a set-point value of at least one low-level controller in the plant or part thereof.

2. The method of claim 1, wherein the state encoder network is chosen to be an encoder part of an encoder-decoder arrangement that first maps a plurality of state variables to a representation of the operating state of the plant or part thereof and then reconstructs a plurality of state variables from this representation.

3. The method of claim 1, wherein the action decoder network is chosen to be a decoder part of an encoder-decoder arrangement that first maps a sequence of actions, and/or a processing result derived from this sequence of actions, to a representation, and then reconstructs a sequence of actions, and/or a processing result derived therefrom, from this representation.

4. The method of claim 1, wherein the state encoder network, and/or the action decoder network, comprises a recurrent neural network (RNN), and/or a transformer neural network.

5. The method of claim 1, wherein the state-to-action network comprises a convolutional neural network, and/or a fully connected neural network.

6. The method of claim 1, wherein the plant or part thereof is a continuous or process plant that is configured to emit alarms and events data.

7. The method of claim 1, wherein the plant or part thereof comprises one or more of: a waste incineration plant; a hydrocarbon separation plant; a reinjection system for injecting water into a hydrocarbon well; a hydrocarbon exploitation facility; and/or a deglycol regeneration plant.

8. A computer-implemented method for training an arrangement of networks, comprising:
   obtaining a pre-trained first encoder-decoder arrangement of an action encoder network and an action decoder network;
   obtaining a pre-trained second encoder-decoder arrangement of a state encoder network and a state decoder network;
   obtaining samples of training data, wherein each sample of the samples of training data comprises values of a plurality of state variables that characterize an operating state of the plant or part thereof, and a sequence of actions taken in response to the operating state;
   encoding by the pre-trained state encoder network the values of state variables in each sample into a representation of a respective operating state, wherein the representation of the respective operating state depends on fewer variables than the respective operating state;
   mapping by the to-be-trained state-to-action network the representation of the operating state to a representation of a sequence of actions, wherein the representation of the sequence of actions depends on fewer variables than the sequence of actions;
   measuring by using a predetermined loss function an extent to which:
      the representation of the sequence of actions agrees with a representation obtained by encoding, by the pre-trained action encoder network, the sequence of actions in the training sample; and/or
      a sequence of actions obtained by decoding, by the pre-trained action decoder network, the representation of the sequence of actions agrees with the sequence of actions in the training sample,
      thereby obtaining a rating; and
   optimizing parameters that characterize behavior of the to-be-trained state-to-action network such that, when further training samples are processed, the rating by the loss function is likely to improve,
   wherein the state variables comprise one or more of: a pressure, a temperature, a mass flow, a voltage, an electrical current, a fill level, and/or a concentration of a substance in a mixture of substances, and
   wherein the actions comprise one or more of: enabling or disabling a piece of equipment in the plant or part thereof; opening or closing a valve in the plant or part thereof; and changing a set-point value of at least one low-level controller in the plant or part thereof.

9. The method of claim 8, wherein obtaining of a first pre-trained encoder-decoder arrangement of an action encoder network and an action decoder network comprises:
obtaining training samples of sequences of actions;
providing the sequence of actions in each training sample, and/or a processing result derived therefrom, to the to-be-trained action encoder network, thereby obtaining a representation;
providing this representation to the to-be-trained action decoder network, thereby obtaining a sequence of actions, and/or a processing result derived therefrom;
measuring, by using a predetermined loss function, to which extent this sequence of actions, and/or this processing result, is in agreement with the sequence of actions, and/or the processing result, in the training sample; and
optimizing parameters that characterize the behavior of the to-be-trained action encoder network and the to-be-trained action decoder network such that, when further training samples are processed, the rating by the loss function is likely to improve.

10. The method of claim 9, wherein the to-be-trained action encoder network and the to-be-trained state encoder network are combined in one single network architecture.

11. The method of claim 8, wherein obtaining a second pre-trained encoder-decoder arrangement of a state encoder network and a state decoder network comprises:
obtaining training samples comprising values of a plurality of state variables that characterize an operating state of the plant or part thereof;
providing the values of state variables in each training sample to the to-be-trained state encoder network, thereby obtaining a representation;
providing the representation to the to-be-trained state decoder network, thereby obtaining values of state variables;
measuring, by using a predetermined loss function, to which extent these values are in agreement with the values in the training sample; and
optimizing parameters that characterize the behavior of the to-be-trained state encoder network and the to-be-trained state decoder network such that, when further training samples are processed, the rating by the loss function is likely to improve.

12. The method of claim 8, wherein obtaining training samples for the training of the first encoder-decoder arrangement, and/or the second encoder-decoder arrangement, and/or the state-to-action network, comprises aggregating training samples obtained in multiple industrial plants.

13. One or more non-transitory computer-readable mediums having processor-executable instructions stored thereon for determining an appropriate sequence of actions to take during operation of an industrial plant or part thereof, wherein the processor-executable instructions, when executed, facilitate:
obtaining values of a plurality of state variables that characterize an operational state of the plant or part thereof;
encoding by at least one trained state encoder network the plurality of state variables into a representation of the operating state of the plant or part thereof, wherein the representation of the operating state depends on fewer variables than the operating state of the plant;
mapping by a trained state-to-action network the representation of the operating state to a representation of a sequence of actions to take in response to the operating state, wherein the representation of the sequence of actions depends on fewer variables than the sequence of actions; and
decoding by a trained action decoder network the representation of the sequence of actions to the sequence of actions to take,
wherein the state variables comprise one or more of: a pressure, a temperature, a mass flow, a voltage, an electrical current, a fill level, and/or a concentration of a substance in a mixture of substances; and
wherein the actions comprise one or more of: enabling or disabling a piece of equipment in the plant or part thereof; opening or closing a valve in the plant or part thereof; and changing a set-point value of at least one low-level controller in the plant or part thereof.

* * * * *